United States Patent [19]

Bortz

[11] 4,289,717
[45] Sep. 15, 1981

[54] METHOD OF MAKING A CUSHIONED BATHROOM ARTICLE

[75] Inventor: Wayne E. Bortz, Seattle, Wash.

[73] Assignee: The Soft Bathtub Company, Seattle, Wash.

[21] Appl. No.: 85,995

[22] Filed: Oct. 18, 1979

[51] Int. Cl.³ .................. B29D 27/04; A47K 3/00
[52] U.S. Cl. ........................ 264/46.5; 4/584; 4/631; 4/651; 264/46.6; 264/257; 264/261
[58] Field of Search .............. 264/46.6, 46.8, 46.5, 264/257, 261; 4/584, 631, 651

[56] References Cited

U.S. PATENT DOCUMENTS

| | | | |
|---|---|---|---|
| 2,695,256 | 11/1954 | De Olloqui et al. | |
| 3,045,254 | 7/1962 | Cook et al. | |
| 3,088,539 | 5/1963 | Mathues et al. | 264/46.6 X |
| 3,108,852 | 10/1963 | Olsen | 264/46.6 |
| 3,413,389 | 11/1968 | Footner | 264/46.6 X |
| 3,419,455 | 12/1968 | Roberts | 264/46.6 X |
| 3,816,234 | 6/1974 | Winfield | |
| 3,929,948 | 12/1975 | Welch et al. | 264/46.9 X |
| 4,032,608 | 8/1977 | Zinniger et al. | 264/46.6 |
| 4,043,853 | 8/1977 | Saladino | |
| 4,209,862 | 7/1980 | Cortes-Garza | 264/46.5 X |

FOREIGN PATENT DOCUMENTS

| | | | |
|---|---|---|---|
| 2152955 | 5/1973 | Fed. Rep. of Germany | 264/46.8 |
| 185823 | 10/1963 | Sweden | 264/46.6 |
| 1021269 | 3/1966 | United Kingdom | 264/46.6 |
| 1239219 | 7/1971 | United Kingdom | 264/46.8 |

Primary Examiner—Philip Anderson
Attorney, Agent, or Firm—Christensen, O'Connor, Johnson & Kindness

[57] ABSTRACT

A method for fabricating a cushioned bathroom article. A fiberglass-reinforced, polyester resin base is fabricated, preferably by a two-part mold resin injection process. A composite, flexible polymeric skin is fabricated in two steps. In the first step, a first layer of an appropriate resinous material is applied to a form which has a configuration generally complementary to the configuration of the base. A second layer of relatively dense, flexible skin foam is applied to the first layer while the first layer is still on the form. The base is assembled with the coated form so that a cavity is defined between the base and the composite skin, and a flexible cellular foam, preferably of polyurethane, is formed in the cavity by an in situ foaming process.

8 Claims, 8 Drawing Figures

METHOD OF MAKING A CUSHIONED BATHROOM ARTICLE

FIELD OF THE INVENTION

This invention generally relates to methods of making cushioned bathroom articles and, more particularly, to methods of making cushioned bathroom articles which have a laminar structure including a composite, flexible polymeric skin, a relatively rigid base and a flexible cellular foam sandwiched between and bonded to the composite skin and the base.

BACKGROUND OF THE INVENTION

Cushioned bathroom articles, such as bathtubs, shower stalls, sinks and the like, are known in the prior art as being formed from a laminated structure having a flexible polymeric layer, typically of vinyl, a base, typically made of a fiberglass-reinforced, polyester resin, and a cellular foam sandwiched between the flexible polymeric layer and the base. Such cushioned bathroom articles are comparable in appearance with conventional steel or iron, porcelain-coated bathroom receptacles, and the foam provides improved thermal and acoustic insulation over such conventional receptacles. Moreover, when this composite structure is applied to bathtubs, the combination of the flexible polymeric outer layer and the foam makes it unlikely for anyone to slip in the bathtub and cushions any fall that does occur.

For a number of reasons, such cushioned bathroom articles have not found widespread acceptance. Perhaps the most important of these reasons is the fact that the cushioned bathroom articles known to the prior art are less attractive and considerably more expensive to fabricate than conventional bathroom articles, with a consequent large price differential at the retail level. Typical of the prior art cushioned bathroom articles and methods of making the same are those shown in the patent to Winfield, U.S. Pat. No. 3,816,234. In the Winfield patent, the composite structure is formed by first constructing a foam member in the general shape of the desired bathroom articles by assembling precut foam sheets. Then, a fiberglass-reinforced base is formed by applying polyester resin and glass fiber sheets to outer surfaces of the foam member in a conventional hand lay-up process. Thereafter, a finishing foam layer is applied to the inner surfaces of the foam member, the finishing layer being in the form of a putty and serving to mask imperfections and seams in the foam member. Then, a flexible polymeric layer is constructed by spraying or otherwise applying a vinyl resin to the finishing layer. One skilled in the art can readily appreciate that this process involves much hand labor, resulting in a bathroom article which is quite expensive to manufacture.

Another reason for the relatively high cost of cushioned bathroom articles made by prior art methods is the high incidence of production of articles which are defective by reason of their having large voids, or air spaces, in the foam layer. This is a particularly severe problem in articles wherein the foam layer is formed in situ with a self-foaming resin. Since the foam is cured in situ, the formation of such voids cannot be detected, and thus prevented, during fabrication of the article. The resulting cushioned article typically has areas of uneven texture and strength, and may in some cases exhibit warpage and distortion of the cushioned surface of the article. Typically, the outer vinyl coating is not sufficiently thick or strong to mask even relatively small voids. This problem results in a relatively high rejection rate for bathtubs made by such a process, with the result that the cost of producing bathtubs by such a method is increased accordingly.

It is therefore an object of this invention to provide a method of making an improved cushioned bathroom article.

It is another object of this invention to provide such a method of making an improved cushioned bathroom article which is formed of a laminar structure having a composite, flexible polymeric skin, a base and a cellular foam sandwiched between the flexible polymeric skin and the base, with the foam being formed by an in situ foaming process. It is also an object to provide a method of making such an article whereby the formation of voids in the cellular foam is minimized and whereby the adverse effects of such voids, in the event they do form, are also minimized.

It is yet another object of this invention to provide a method for constructing cushioned bathroom articles which significantly reduces the amount of hand labor involved and also reduces the rejection rate for the produced articles, thereby resulting in cushioned bathroom articles which are comparable in cost to that of conventional bathroom articles.

SUMMARY OF THE INVENTION

These objects and others that will be realized from a consideration of the following portion of the specification are achieved, briefly, in a method for making a cushioned bathroom article. The method comprises the steps of fabricating a relatively rigid base, the base having a configuration generally similar to that of the cushioned bathroom article when finished. A composite, flexible polymeric skin is fabricated by first applying a layer of a resinous material to a form having a configuration complementary to the configuration of the base. A second layer of a relatively dense, flexible skin foam is applied to the layer of resinous material. The base is assembled with the form so as to define a cavity between the base and the composite, flexible polymeric skin, and the cavity is filled with a cellular foam by an in situ foaming process. The base, the composite polymeric skin and the cellular foam therebetween are then disassembled from the form.

In a preferred form, the base is fabricated from a resinous material comprising a fiberglass-reinforced polyester resin, the resinous material of the composite, flexible polymeric skin is a vinyl polymer, the flexible skin foam is a dense polyurethane skin foam and the cellular foam is a flexible polyurethane foam.

The cushioned bathroom article made by such a method therefore comprises a composite outer skin, a base and a cellular foam sandwiched between the outer skin and the base, with the cellular foam being formed in place by an in situ foaming process.

BRIEF DESCRIPTION OF THE DRAWINGS

The invention can best be understood by reference to the following portion of the specification, taken in conjunction with the drawings, in which.

DESCRIPTION OF THE PREFERRED EMBODIMENT

While the invention will be described with reference to the construction of a cushioned bathtub, it should be clear to those skilled in the art that the invention also finds application in the fabrication of other cushioned bathroom articles, such as shower stalls, sinks and the like.

Figure 1:
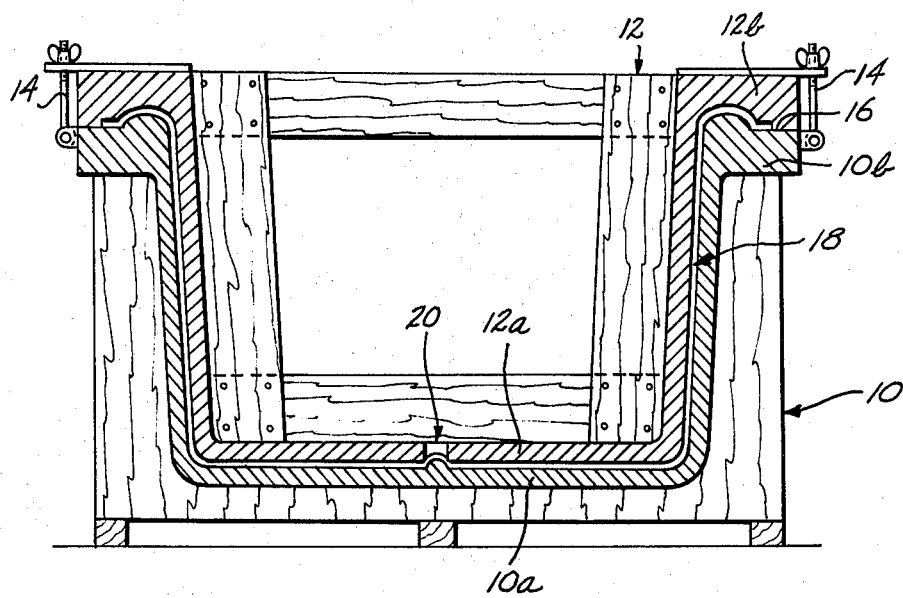
FIG. 1 is a cross-sectional view of a two-part mold used to fabricate a fiberglass-reinforced, polyester resin bathtub base by a conventional injection molding process.
Figure 2:
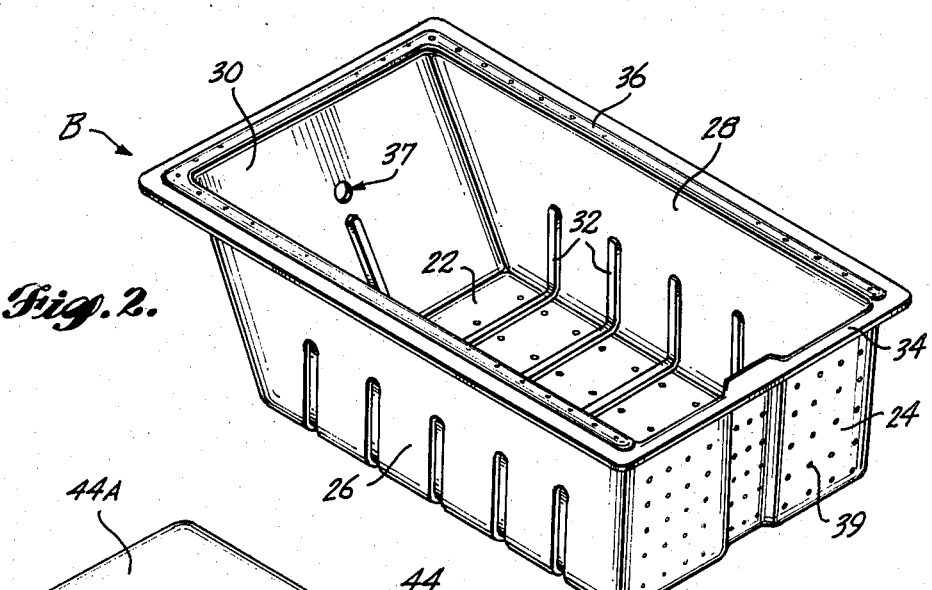
FIG. 2 is a pictorial view of the fabricated base.

The first step in the fabrication process is the construction of a base having a configuration generally similar to that of the finished cushioned bathtub and which provides a desired degree of rigidity and strength therefor. Referring to FIGS. 1 and 2, the base B is fabricated from polyester resin and reinforcing fiberglass fabric by a conventional two-part mold, resin injection process. In FIG. 1, a female part 10 of a two-part mold is designed to sit upon a flat surface and includes a central wall portion 10a surrounded by a peripheral flange portion 10b. Likewise, a male part 12 of the two-part mold includes a central wall portion 12a, complementary to wall portion 10a, and a surrounding peripheral flange portion 12b which is generally complementary to flange portion 10b. In assembly, the male part 12 fits into the female part 10, with the flange portions 12b and 10b abutting along their peripheries at 16, and with there being defined between the male part 12 and the female part 10 a cavity 18 whose configuration is that of the desired bathtub base B.

To fabricate the bathtub base B, the opposed inside surfaces of the female part 10 and male part 12 are coated with a suitable parting agent, such as that identified as "MR 100", available from Manufacturing Associates, Inc., St. Louis, Missouri. A fiberglass mat is precut according to a predetermined pattern and then laid into the female part 10. Preferably, a single layer of 2.5 ounce, continuous strand fiberglass mat (available from Owens-Corning) is used on the side walls. Two plies of the fiberglass mat are used in high stress areas such as the floor and end walls. Then, the male part 12 is assembled with the female part 10 and secured thereto by a plurality of clamps 14. Polyester resin and an appropriate catalyst, both in liquid form, are mixed in an appropriate apparatus and then force-injected through an aperture 20 in the central wall portion 12a of male part 12, into and throughout the cavity 18. Vent holes (not shown) at the corners of the female part 10 allow air to escape from the cavity 18 during injection of the resin. In practice a suitable polyester resin and a catalyst consisting essentially of methyl ethyl ketone peroxide, available from the Norac Company, Azusa, California 91702, are found to be satisfactory.

After injection, the polyester resin within the cavity 18 is allowed to partially cure for about 10 to 12 minutes, after which the clamps 14 are released and the male part 12 is removed. After another 8 to 10 minutes, the resin is sufficiently cured so that the base B can be separated from the female part 10. The base B is then removed from the female part 10 and allowed to stand for about 24 hours to effect complete curing, whereupon it appears generally as illustrated in FIG. 2.

It will be seen that the base B includes a substantially planar floor 22 of rectangular configuration, substantially planar front and side walls 24, 26 and 28, respectively, each upstanding from floor 22, and a sloping rear wall 30 upstanding from floor 22 and integral with side walls 26 and 28. A plurality of stiffening ribs 32 are provided in the floor 22 and in adjacent portions of side walls 26 and 28 and the rear wall 30. A peripheral flange 34 extends from the upper edges of front wall 24, side walls 26 and 28 and rear wall 30, with the portions of the peripheral flange 34 adjacent side walls 26 and 28 and rear wall 30 having a peripheral rib 36 therein.

After curing, flash on the edge of the peripheral flange 34 is trimmed off. A foam injection port 37 is drilled through the sloping rear wall 30 for injection of a self-foaming resin in the in situ foaming process described hereinafter. Also, a plurality of 1/16 inch vent apertures 39 are drilled through the floor 22, the front wall 24 and along the peripheral rib 36.

Figure 3:
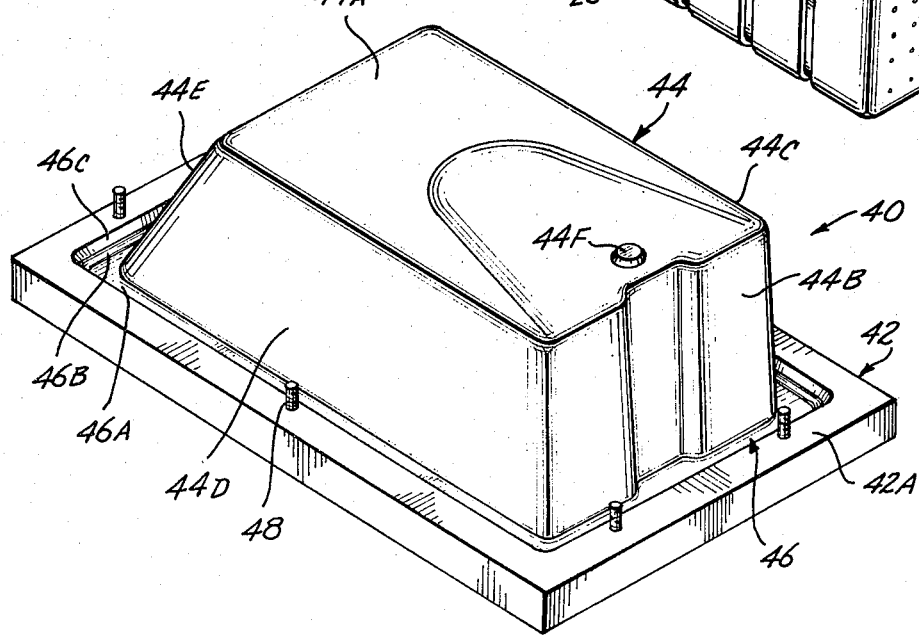
FIG. 3 is a pictorial view of a form for fabricating the composite, flexible polymeric skin.

Now referring to FIG. 3, a composite, flexible polymeric skin S (shown in FIG. 4) is formed on the surfaces of a form 40. Specifically, the form 40 includes a base 42 having a substantially planar, peripheral surface 42A. A member 44 having a configuration equaling that of the desired inner surface of the bathtub projects from base 42 and includes a floor surface 44A generally complementary to floor 22 of base B, a front wall surface 44B generally complementary to front wall 24 of base B, a pair of side wall surfaces 44C and 44D generally complementary to side walls 26 and 28 of base B, and a sloping rear wall surface 44E generally complementary to rear wall 30 of base B. Protruding from the floor surface 44A is a projection 44F which is positioned at the desired location of the drain for the bathtub. As seen in FIG. 3, a recess 46 is provided in the base 42 surrounding the member 44 wherein the arms of the bathtub are cast. The recess 46 includes a bottom floor portion 46A, an outer upright wall portion 46B and an angled wall portion 46C extending outwardly at an angle of 45° from the upper edge of the wall portion 46B and being located intermediate between the upright wall portion 46B and the peripheral surface 42A. A plurality of threaded studs 48 project upwardly from the peripheral surface 42A.

Preparatory to fabrication of the composite, flexible polymeric skin, the peripheral surface 42A and all surfaces of the member 44 and the recess 46 are first prepared with mold releasing agents. Such preparation includes manual application and buffing of a base coat of mold release wax at intervals of one to two weeks. Additionally, the surfaces are sprayed prior to each use with polyvinyl alcohol, available commercially under the tradename Partall P.V.A. No. 10 from Rexco Chemical Corp., Carpinteria, California.

Figure 4:
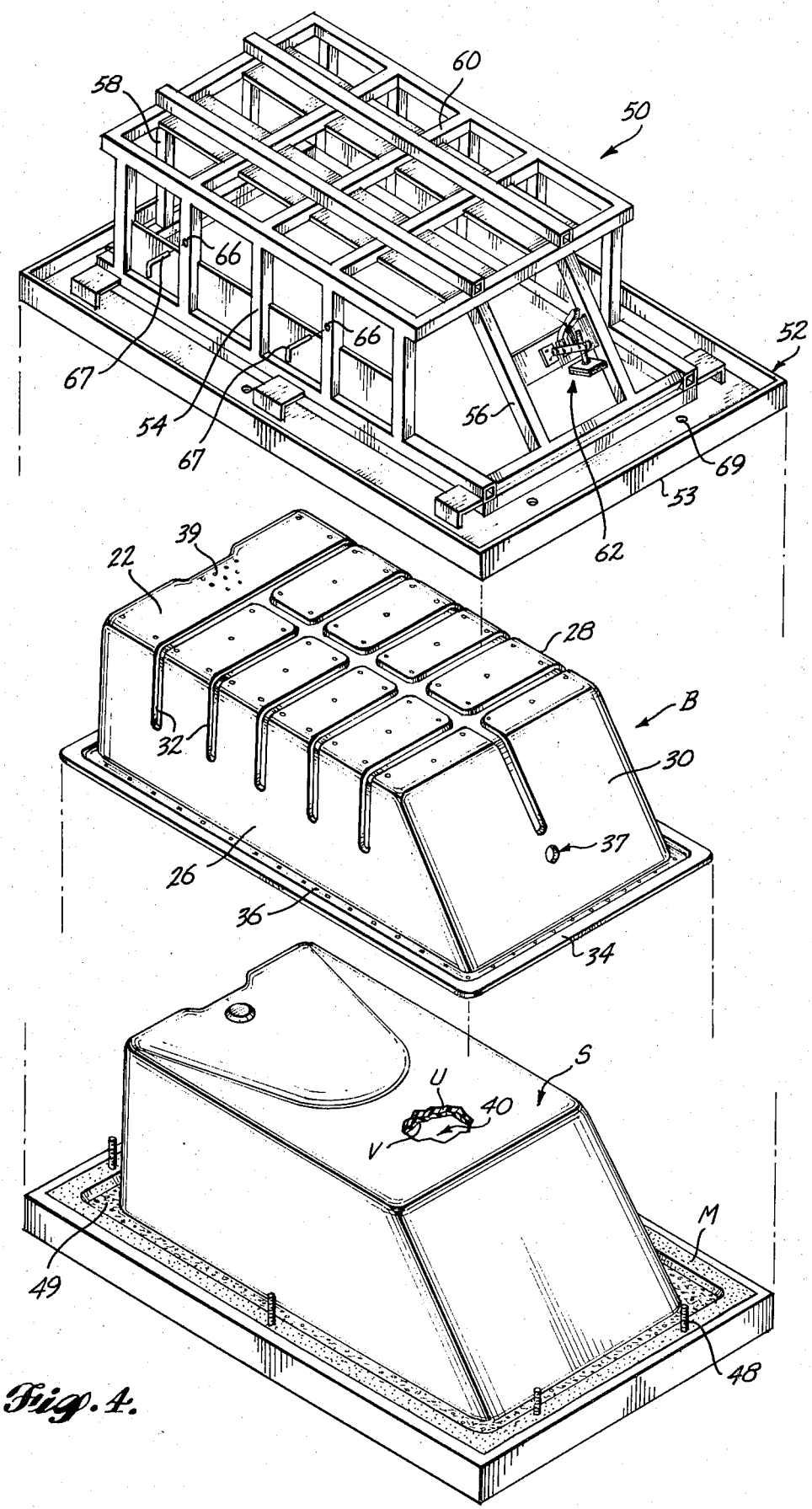
FIG. 4 is an exploded pictorial view showing an assembly of the form with the composite polymeric skin thereon, the base and a frame for assembly of the base with the form for purposes of forming, in situ, the cellular foam in the cavity between the base and the form.

Referring to FIG. 4, the composite polymeric skin S is formed in two steps. In the first step, a vinyl layer V is formed on the surfaces of the form 40 by spraying onto the surfaces a mixture of a vinyl polymer and a volatile carrier solvent consisting essentially of methyl ethyl ketone. In the second step, a polyurethane skin foam layer U is formed over the vinyl layer V.

A preferred vinyl polymer solution for use in the first step is sold under the trademark "VINALAC" and is available from United Vinyl Products, of Seattle, Washington. The vinyl polymer solution is diluted with the methyl ethyl ketone solvent in a ratio of approximately three parts vinyl polymer solution to two parts solvent by volume. The mixture is sprayed onto the form 40 with an airless spray gun. Preferably, the vinyl polymer mixture is sprayed onto the form 40 in two immediately consecutive layers, the first layer containing pigments and the second layer being free of pigment. Such a two-step procedure is preferred for application of the vinyl layer V to conserve the amount of pigmented vinyl needed to be held in stock. The vinyl polymer mixture is applied until the resulting vinyl layer V is of a total thickness of approximately 0.020-0.030 inch. Thereafter, the solvent is allowed to evaporate, a process that takes about three hours. An electric heater and a fan (not shown) are placed under the form 40 and actuated to raise the temperature of the form 40 to above ambient room temperature and thereby accelerate curing of the vinyl layer V and the skin foam layer U described below. After curing of the vinyl layer V, a masking jig M is applied on the portions of the vinyl layer V overlying the angled surface 46C and the peripheral surface 42A for the purposes hereinafter described.

Subsequent to the formation of the vinyl layer V, a layer of flexible polyurethane skin foam is sprayed onto the surface of the vinyl layer V. The purpose of the polyurethane skin foam layer U is to form a thicker polymeric skin S by adding strength and body to the vinyl layer V. Although the vinyl layer V could be applied in thicker amounts to achieve a similar result, it is found that the application of a polyurethane skin foam layer can be made in a much shorter time and more economically than can be applied and cured a thicker vinyl layer. It has been found that formation of a thick vinyl layer requires repeated applications and lengthy curing times, thus rendering the use of the polyurethane skin foam layer U, which cures in a matter of minutes, particularly advantageous. The polyurethane layer U is applied to a thickness of 0.040-0.060 inch, to give a composite skin S having a total thickness of between ⅛ inch and 3/16 inch, including both the vinyl layer V and polyurethane skin foam layer U.

The flexible polyurethane skin foam layer U applied in the manner described above does not foam substantially. Although the polyurethane skin foam layer U is formed from a self-foaming polyurethane resin, when sprayed on in a thin layer it does not generate and retain sufficient heat to induce substantial foaming. Consequently, the thin layer of polyurethane resin cures to form a flexible polymeric layer generally similar to the vinyl polymer layer V, but having numerous micropores which are readily visible under low magnification. The term "skin foam" (also commonly referred to as an "integral skin foam") refers to a foaming resin which forms an integral adherent skin against surfaces with which the resin is in contact during curing. Such resins include a surfactant which causes resin to wet the surface and cause the "skin" to form against the surface as the resin foams and cures. Satisfactory two-component polyurethane skin foam resins are available from Witco Chemical Company, Wilmington, Delaware (Isocyanate Division).

The vinyl polymer is preferred for use as the final surface layer of the inside of the bathtub because it is readily made less susceptible to deterioration by ultraviolet radiation by the inclusion of UV inhibiting agents. It is also available in a wide variety of colors and forms an attractive and chemically inert surface. The combination of the outer vinyl layer V and the inner polyurethane layer U provides a composite skin S which is particularly strong and which masks small voids in the underlying foam layer discussed below. Also, the preferred composite skin is fast-curing and economical.

Figure 5:
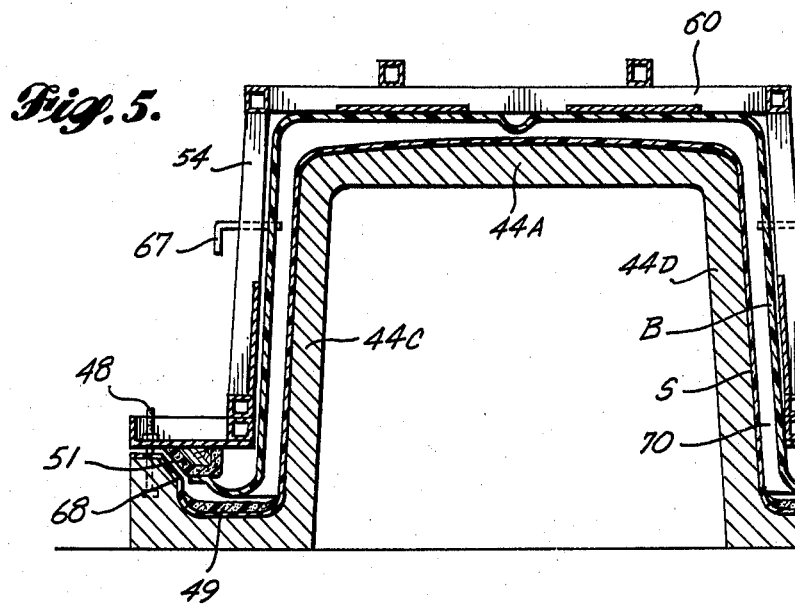
FIG. 5 is a cross-sectional view of the assembled form, base and frame.
Figure 6:
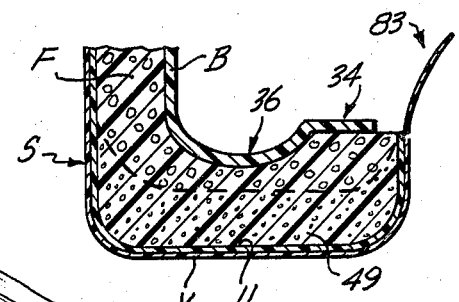
FIG. 6 is a cross-sectional view showing details of the laminated components of the composite skin and a reinforcing layer of high density skin foam used along the arms of the bathtub (not necessarily to scale)

In forming the skin S around the arms of the bathtub in the recess 46, an additional amount of polyurethane skin foam is applied in the recess 46 over and above the amount used to form the polyurethane skin foam layer U described above. This additional amount of polyurethane skin foam is applied in a quantity sufficient to induce foaming. Specifically, a layer 49 of polyurethane skin foam approximately one-inch thick is formed along the bottom of the recess 46, as shown in FIGS. 4, 5 and 6. This layer 49 provides additional strength to the arms of the bathtub where local stresses are greater and also prevents shrinkage of the injected polyurethane foam described below. More specifically, forming the extra layer 49 of polyurethane skin foam in the recess 46 ensures the absence of voids in the foam of the bathtub arms, where voids would be most noticeable by persons bearing upon the arms during entry to and exit from the bathtub. Also, the integral skin foam is generally somewhat denser (6.5 lbs./ft.$^3$) than the standard polyurethane foam (2.8 lbs./ft.$^3$) used as described below, and is also somewhat stronger and stiffer, and is therefore particularly suitable for the weight-bearing arms of the bathtub. The masking jig M is removed upon curing of the skin foam layer 49.

In the next step of the fabrication process, the base B is inverted, secured to a frame 50 and placed over and secured to the form 40, resulting in a cavity between the base B and the form 40 into which a conventional self-foaming polyurethane resin may be injected and allowed to expand and cure to create a cellular foam in the cavity.

With reference to FIGS. 4 and 5, the frame 50 is seen to comprise a steel framework, the interior dimensions of which generally conform with the exterior dimensions of the base B. Frame 50 has a generally rectangular frame base 52 having a lower surface 53 generally complementary to the peripheral surface 42A of the form 40 and the flange 34 of the base B. A seal 51 (shown in FIG. 5) depends downwardly from the lower surface 53 for the reasons discussed below. The frame 50 further includes upright frame members 54 complementary with the side walls 26 and 28 of the base B, angled frame members 56 complementary with the rear wall 30 of the base B, and upright end members 58 complementary with the front wall 24 of the base B. Additionally, a rectangular array of crossed top frame members 60 spans the floor portion 22 of the base B. A manually operated closure device 62 is mounted between the angled frame members 56 for sealing the port 37 upon completion of the foam injection process described below.

The base B is assembled with the frame 50 by inverting the base B as shown in FIG. 4 and lowering the frame 50 over the base B until the bottom surface 53 of the rectangular base 52 and the seal 51 engage the underside of the peripheral flange 34. Four holes (not shown) are drilled through the side walls 26 and 28 of base B at positions indicated by apertures 66 in the frame side members 54. Removable pins 67 are then inserted through the apertures 66 and into the holes in the base B to secure the base B to the frame 50.

The assembled base B and frame 50 are then lowered onto the form 40, with the member 44 projecting into the interior of the base B, until the bottom surface 53 of the frame base 52 and the seal 51 conformably abut the formerly masked portions of the vinyl layer V overlying the surfaces 42A and 46C. The seal 51 consists of a wood rib covered with ¼ inch of foam rubber and an outer covering of polyethylene sheeting. The seal 51 extends entirely around the lower surface 53 of the frame base 52 and depends downwardly therefrom. The seal 51 is cooperably formed to press against the angled wall portion 46C of the form 40 and also the underside of the base flange 34 to thereby seal the gap between the edge of the flange 34 and the wall portions 46B and 46C, and thereby prevent leakage of foam resin during the in situ foaming step described below. At this point, it will be noted (FIG. 5) that the base B is separated from the composite polymeric skin S to define therebetween a cavity 70. The studs 48 on base 42 of form 40 protrude through aligned holes 69 in the frame base 52 and are fitted with nuts to secure the base B in the position illustrated in FIG. 5 for the subsequent in situ foaming process.

The cavity 70 is then filled with a flexible cellular foam F by an in situ foaming process. Preferably, the cellular foam comprises a flexible polyurethane foam material, such as is available from Witco Chemical Company, Wilmington, Delaware. The two-component resin mixture is placed in a conventional flexible foam machine, such as that available from the Witco Chemical Company, and is injected under force in liquid form through the port 37, with the foam thereafter expanding as is conventional throughout the cavity 70 and with trapped air escaping through the vent apertures 39. The port 37 is closed with the closure device 62 to contain the curing foam. During expansion and subsequent curing, the foam F bonds to the interior surfaces of the base B and to the interior surface of the polyurethane skin foam layer U of the skin S defining the cavity 70.

The amount of foam F used as well as the output rate of the dispensing unit are critical to obtaining a final product having optimum texture and strength. In practice, it is found that an overpack of 50% to 100% achieves superior results, with 80% being used preferably for optimum results. By 80% overpack it is meant that 80% more foam by weight is injected into the cavity 70 than would be required to just fill the cavity 70 with foam upon complete curing. If an insufficient overpack of foam is used, there is a likelihood that the foam will not be distributed evenly throughout the cavity 70, resulting in large void spaces within the cavity 70. If too much foam is used, the cured foam often displays shrinkage, with consequent deformation of the bathtub surfaces.

After curing (a process which takes about fifteen minutes), the nuts on the studs 48 are removed and the assembled bathtub comprising the base B, the composite skin S and the foam F sandwiched therebetween, together with the frame 50, is removed from the form 40, with the skin S separating from the surfaces of the recess 46, the member 44, and the surface 42A of form 40. Then, the pins 67 are removed and the frame 50 is separated from the bathtub.

The portions of the vinyl layer V formed on the surfaces 46C and 42A result in a loose peripheral flap 83 of vinyl which is normally left intact until the bathtub is ready for final installation. At the time of installation, the peripheral flap 83 of vinyl may be trimmed and then folded over the flange 34 of the base B and adhesively bonded thereto, such as by the use of an appropriate contact adhesive. Alternatively, the loose flap 83 of vinyl on the peripheral edge of the bathtub may be folded upwardly and secured to a bathroom wall against which the bathtub is placed, to thereby provide a watertight seal between the bathtub and the wall.

Figure 7:
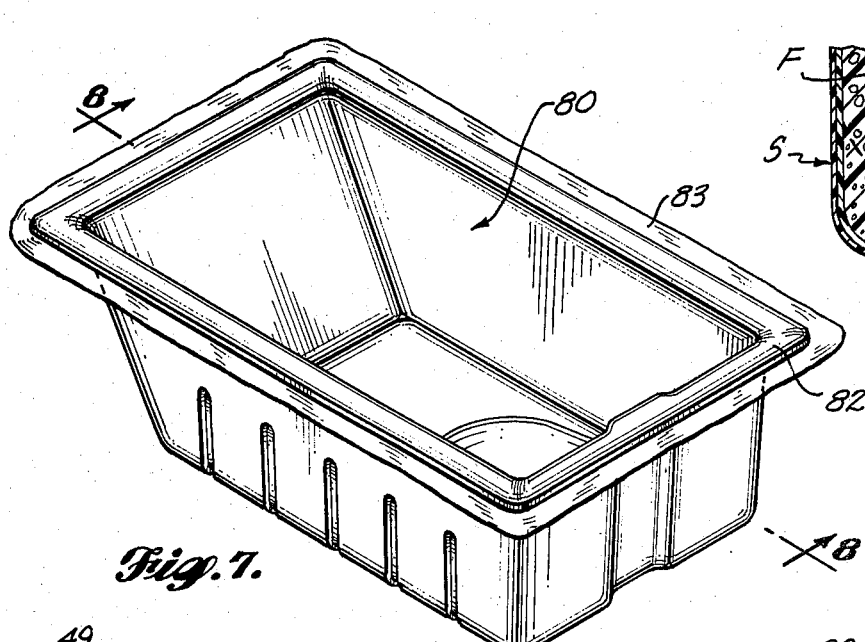
FIG. 7 is a pictorial view showing the fabricated cushioned bathtub.
Figure 8:
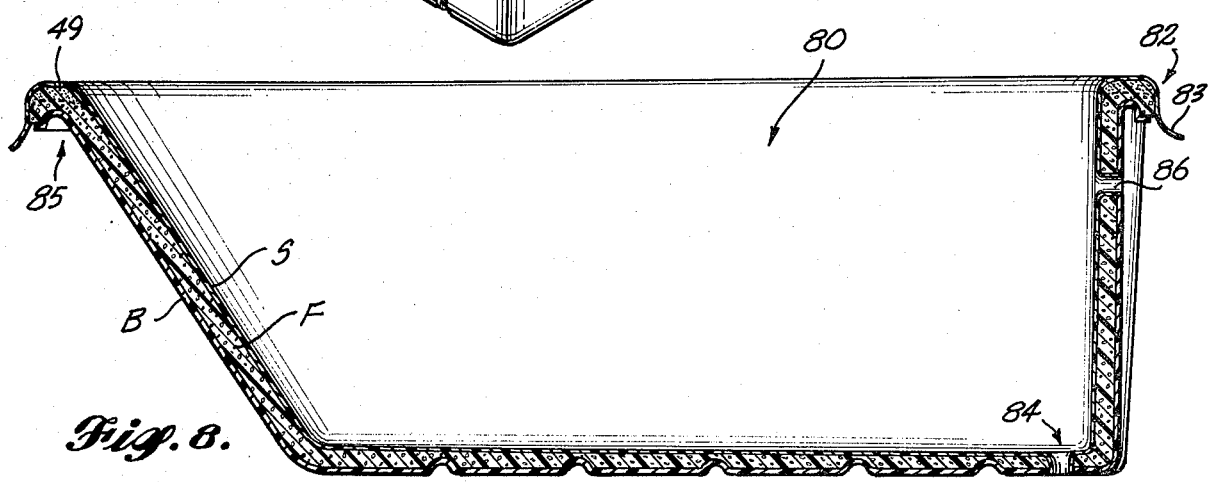
FIG. 8 is a cross-sectional view of the fabricated cushioned bathtub taken along the line 8—8 in FIG. 7.

The finished bathtub then appears as seen in FIGS. 7 and 8 as comprising a center receptacle portion 80 and an outer, laminated peripheral arm flange 82, the upper surfaces which are covered by the composite skin S, and the lower surfaces of which in large part are formed by the base B, with the foam F being sandwiched therebetween at substantially all points. The flap 83 of vinyl extends from the edge of the arm flange 82. The flap 83 may either be trimmed off or left on, as mentioned above. It will be noted that the projection 44F on the member 44 (FIG. 3) has resulted in an opening 84 in the bottom of the bathtub, which opening is closed by the skin S and the base B, both of which must be removed by drilling or otherwise to form a drain for the bathtub. An overflow outlet 86 is formed on the front wall of the bathtub in a similar manner.

The bathtub as illustrated in FIGS. 7 and 8 may be installed as is by lowering the bathtub into a suitable framework, whereupon the bathtub either rests on the floor or is supported by the flange 82, or both. Alternatively, the bathtub may be freestanding, merely resting on the floor and with its exposed sides being covered by appropriate facia, not illustrated, one end of which can be inserted into a recess 85 provided by the underside of the rib 36 of base B in the lower surface of the flange 82. As yet another example, the bathtub may be inserted into an enclosure formed by one to three walls, with a framework depending from those walls and supporting the flange 82, and with the exposed side or sides of the bathtub being covered by appropriate facia.

While the invention has been described with reference to a preferred embodiment, it is to be clearly understood by those skilled in the art that the invention is not limited thereto, but rather that the scope of the invention is to be interpreted only in conjunction with the appended claims.

The embodiments of the invention in which an exclusive property or privilege is claimed are defined as follows:

1. A method for making a cushioned bathroom receptacle, said method comprising the steps of:
   (a) fabricating a base, said base having a wall portion, a floor portion and a peripheral flange portion, said wall portion being closed at one end by said floor portion and being open at an opposite end, and said peripheral flange portion being integral with and extending from the open end of said wall portion;
   (b) fabricating a composite flexible polymeric skin by;
      (1) spraying a liquid mixture of a resinous material and a volatile carrier therefor on a form having a peripheral surface, a recess and a member having a wall surface and a floor surface, said member centrally projecting from said peripheral surface, said wall surface of said member being generally complementary to said wall portion of said base, said floor portion of said member being generally complementary to said floor portion of said base, said recess surrounding said wall surface of said member and joining said wall surface and said peripheral surface, said recess being generally complementary to said peripheral flange portion of said base, and allowing said resinous material to completely cure to form a first layer of said resinous material;

(2) thereafter spraying a self-foaming flexible skin foam resin on first layer of said resinous material on said form, said resin being applied to said first layer on all of said surfaces of said form in a layer sufficiently thin to prevent substantial foaming of said resin and thereby produce a relatively dense flexible skin foam layer on said first layer of said resinous material, to thereby form said composite flexible polymeric skin, said skin having a first portion overlying said peripheral surface of said form, a second portion overlying said wall surface, a third portion overlying said recess, and a fourth portion overlying said floor surface;

(c) thereafter applying said self-foaming skin foam resin in said recess in an amount sufficient to induce foaming and produce a layer of relatively less dense skin foam in said recess adjacent said third portion of said composite flexible polymeric skin;

(d) assembling said base with a frame having a peripheral frame base, said frame base having a lower surface generally similar in configuration to said peripheral surface of said form and having a supporting framework generally similar in its interior configuration to the outer configurations of said wall portion and said floor portion of said base, by inserting said wall portion and said floor portion of said base into said supporting framework of said frame and securing said base to said frame;

(e) assembling said frame with said form so that said lower surface of said peripheral base is adjacent said first portion of said composite flexible polymeric skin, whereby said base is separated from but closely adjacent to said second, third and fourth portions of said composite flexible polymeric skin to define a cavity with said wall portion of said base being in registration with said second portion of said composite flexible polymeric skin, said flange portion of said base being in registration with said third portion of said composite flexible polymeric layer, and said floor portion of said base being in registration with said fourth portion of said composite flexible polymeric layer;

(f) injecting a flexible foam material in liquid form into said cavity and allowing said foam material to expand throughout said cavity to thereby form a flexible foam between said base and said second and fourth portions of said flexible polymeric layer and between said peripheral flange portion of said base and said layer of relatively less dense flexible skin foam in said recess;

(g) disassembling said skin from said form and disassembling said frame from said base.

2. A method as recited in claim 1, wherein said flexible foam material is injected in an amount corresponding to an overpack of between 50% and 80%.

3. A method as recited in claim 2, wherein said base is fabricated from a fiberglass-reinforced polyester resin.

4. A method as recited in claim 3, wherein said base is fabricated by the use of a two-part mold resin injection process.

5. A method as recited in claim 4, wherein said two-part mold, resin injection process comprises the steps of placing fiberglass material in a first part of a two-part mold, assembling said first part of said two-part mold with the second part thereof to define a cavity therebetween, and injecting a liquid mixture of said polyester resin and a catalyst therefor into said cavity.

6. A method as recited in claim 5, wherein said resinous material comprises a vinyl polymer.

7. A method as recited in claim 6, wherein said self-foaming skin foam resin is a flexible polyurethane skin foam resin.

8. A method as recited in claim 7, wherein said flexible foam material comprises a self-foaming polyurethane resin.

* * * * *